March 29, 1960   A. H. BRODBECK ET AL   2,930,433
BURNER ASSEMBLY FOR COOKING RANGES Filed Nov. 30, 1953   2 Sheets-Sheet 1

Almer H. Brodbeck,
Harold C. Reinhart,
Inventors.
Koenig and Pope,
Attorneys.

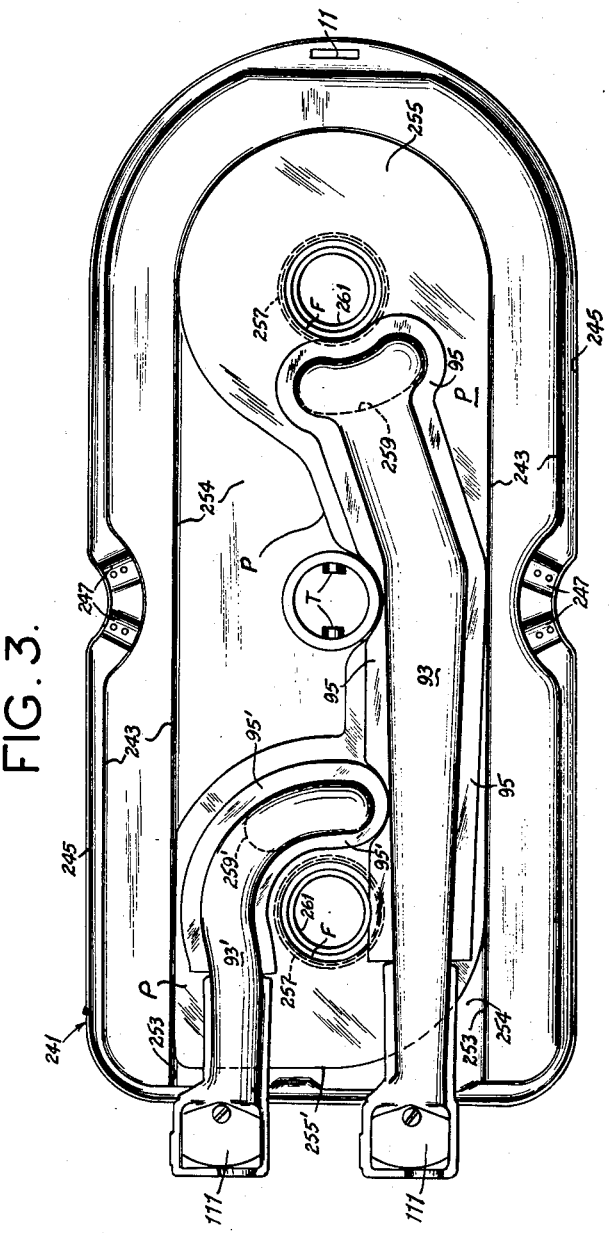

United States Patent Office 2,930,433
Patented Mar. 29, 1960

2,930,433

BURNER ASSEMBLY FOR COOKING RANGES

Almer H. Brodbeck, Webster Groves, and Harold C. Reinhart, Ferguson, Mo., assignors, by mesne assignments, to Dixie Products, Inc.

Application November 30, 1953, Serial No. 394,921

4 Claims. (Cl. 158—105)

This invention relates to burner assemblies for cooking ranges or stoves, and with regard to certain more specific features, to assemblies of this type which incorporate burners, spill-over trays (or bowls) and pilot ignition means. This application is a continuation-in-part of our application, Serial No. 303,744, filed August 11, 1952, for Burner Assembly for Cooking Ranges, now abandoned.

Among the several objects of the invention may be noted the provision of a novel and simple arrangement of burner and tray in assembly, composed primarily of economical and light sheet-metal stampings, the assembly being easily removable from a range for cleaning; the provision of assemblies of the class described which in pairs are interchangeably useful on ranges in so-called cluster-top or divided-top combinations; and the provision of such an assembly which may be readily made gas-tight and conveniently carried out in the form of multiple or single burner constructions. Other objects will be in part apparent and in part pointed out hereinafter.

The invention accordingly comprises the elements and combinations of elements, features of construction, and arrangements of parts which will be exemplified in the structures hereinafter described, and the scope of which will be indicated in the following claims.

In the accompanying drawings, in which a preferred embodiment of the invention is illustrated, Fig. 1 is a plan view of a preferred form of burner and tray assembly;

Fig. 3 is a bottom plan view of Fig. 1; and,

Fig. 4 is a left end view of Fig. 1.

Corresponding reference characters indicate corresponding parts throughout the several views of the drawings.

Briefly, the invention consists of a burner assembly for cooking ranges, comprising a stamped sheet-metal tray (or bowl) preferably dished downward and including upstanding lateral cuffs which are flanged inward at their upper ends. Within these cuffs are flanged individual smaller sheet-metal cuffs, the flanges of which are welded to the tray beneath the integral cuffs. The flanges of the inner cuffs are individual parts of a bottom sheet. There are thus provided annular burner gas passages. Each flange has an opening therein with which communicates a sheet-metal air-gas mixing tube which is welded to the underside of the tray or to said bottom sheet, as the case may be.

Each mixing tube has clinched thereto an inlet cap to provide means for supporting one end of the assembly on the usual gas cocks which are employed on the gas manifolds of the ranges. The upper ends of the annularly spaced cuffs are closed in by means of annular main burner heads.

Each tray is arranged so that a pilot burner may be used in the tray between burners for straight flash-back tubes, and several trays used as a divided-top arrangement; or so that a pilot burner may be used between trays for curved flash-back tubes, and several trays used as a cluster-top arrangement.

There results a light-weight integral burner and tray assembly which, for cleaning purposes, is readily removable from, and applicable to, a range. This tray assembly includes the mixing pipes, which, however, extend downward from the bottom side of the tray and form no unsightly and difficult-to-clean upper tubular surfaces in the downward dish or bowl forming portions of the assembly.

Figure 1:
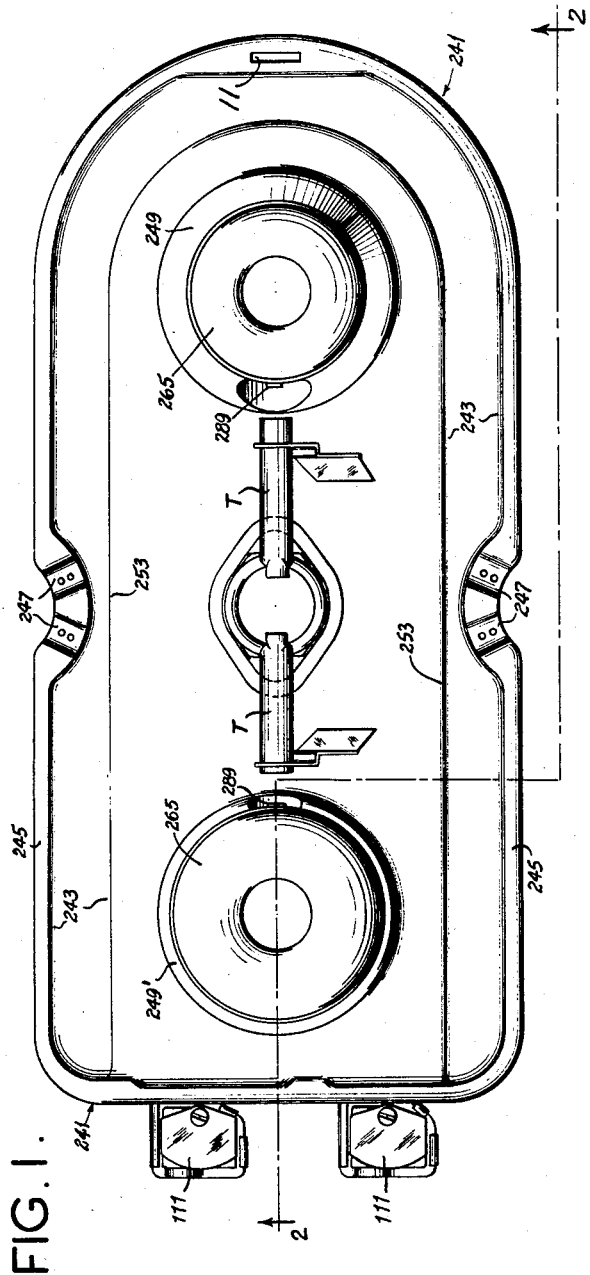
Figure 2:
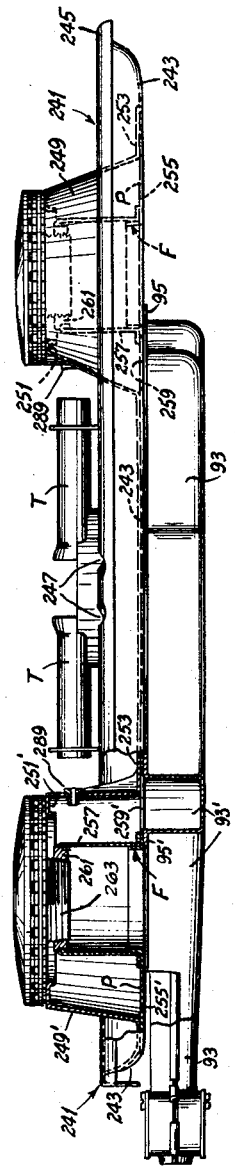
Fig. 2 is a side elevation (partly in section) of Fig. 1, being viewed on line 2—2 of Fig. 1.

Referring now more particularly to Figs. 1–4, there is shown a stamped sheet-metal tray 241 adapted to be supported at the left upon the nozzles of two gas cocks (not shown), and at the right by a slot 11 adapted to engage a suspension bracket (not shown). The sheet metal tray 241 is downwardly dished as shown at 243, having a rim 245 including recesses 247 providing space for accepting the pilot burner (not shown). Integral outer circular cuffs are shown at 249, 249', flanged inward at the top as shown, for example, at 251 and 251'. The cuffs 249 and 249' extend upward from a slightly raised platform or offset portion 253 which is struck up from the bottom, thus leaving a corresponding recess 254 on the lower side (compare Figs. 1–3). At P is shown a flat sheet-metal plate which is welded to the flat bottom of the tray 241 within the recess 254. This plate P includes integral flange extension and bridging portions 255, 255' for covering the openings left by the struck-up cuffs 249, 249'. The flange extension and bridging portions 255, 255' include openings 259, 259' forming entries into the space within the cuffs 249, 249'. The marginal shapes of the flange extension and bridging portions 255 and 255' are coextensive with the marginal shapes of sufficient portions of the offset portion 253 to locate the flange extension and bridging portions so as properly to relate the inner and outer cuffs of the respective pairs 249, 257, 249', 257. Each flange extension and bridging portion 255, 255' includes a central upwardly directed short collar F, around which is telescoped and welded a flanged tube or inner-cuff 257. On the upper end of each inner cuff 257 is a threaded bushing 261. A burner head 265, 265' (as the case may be) is threaded into the bushing, as shown at 263, and seats on the flange 251 or 251'. A small gas nozzle 289 is threaded into the side of each outer cuff 249, 249'. These nozzles direct gas into flash tubes T, the ends of which are spaced somewhat from the nozzles. Since the single burner heads are being employed, this arrangement serves for peripherally igniting the burners.

The purpose of the plate P for carrying the flange extension and bridging portions 255 and 255' is to provide an integral flat surface to which the flanges 95 and 95' of mixing tubes 93 and 93', respectively, are welded. The mixing tubes 93 and 93' have lateral flanges 95 by which they are welded to the bottom side of the plate P. The inlet end of the tubes are provided with swingable air control plates 111.

Figs. 1–4 show that the invention may be carried out in a form in which a single burner head may be used on each cuff 249, 249'. Figs. 1–4 and the above description make clear also the added advantage of a single plate such as P for integrally supporting the bottom flange extension and bridging portions 255, 255'. The advantage of this integral bottom cover plate P is that a smooth continuous flat surface is presented for welding on or otherwise attaching the flanges of the mixing tubes 293 and 293'. The result is a construction that is easier to make gas-tight. Moreover, the inner cuffs 257 may be attached to the plate P around collars F before the plate P is applied and welded in position beneath the tray. This facilitates the alignment of parts during assembly.

Among the advantages of the invention is that the assembly of primary parts is composed of lightweight stampings. Heretofore the burners have been expensive cored castings of considerable weight which were not integral with the spill-over tray. By means of the present invention the spill-over tray has a relatively flat inside bottom and forms an integral part of a compact construction providing the main burner passages. The auxiliaries, such as all burner heads are small parts of light weight. Moreover, the arrangement is such that only a small number of dies is required to produce trays which will be useful in both cluster-top and divided-top arrangements. Assembly by spot welding is economical.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

We claim:

1. A sheet-metal burner and tray assembly of stampings for cooking ranges comprising a downwardly dished substantially flat-bottomed member, the flat bottom of said member having shallow upwardly offset portions, two upstanding integral outer cuffs each extending from said offset portions of the flat bottom, inner cuffs within the outer cuffs, said inner cuffs carrying lower flat lateral extension and bridging portions located in said offset portions and respectively bridging the spaces between paired outer and inner cuffs, each bridging portion having an opening therein connecting with the space between its respective pair of bridged cuffs, said offset portions being substantially equal in depth to the thickness of said extension and bridging portions for flush location thereof, said bridging portions and said offset portions being marginally coextensively shaped and thereby adapted to locate said extension and bridging portions so as properly to relate the inner and outer cuffs of each pair, and substantially flat-topped trough-shaped members having coplanar marginal flanges flatly engaging said extension and bridging portions, said dished member, bridging portions and flanges of the trough-shaped members being welded together in a relationship wherein the trough members cover said openings respectively.

2. A sheet-metal burner and tray assembly of stampings for cooking ranges comprising: a downwardly dished substantially flat-bottomed member, the flat bottom of said member having a shallow upwardly offset portion, two spaced upstanding integral outer cuffs, each extending from said offset portion of the flat bottom, an inner cuff within each outer cuff, said inner cuffs carrying lower flat lateral flange extension and bridging portions located in said offset portion and respectively bridging the spaces between paired outer and inner cuffs, each flange extension and bridging portion having an opening therein connecting with the space between its respective pair of bridged cuffs, said offset portion being substantially equal in depth to the thickness of said flange extension and bridging portions for flush location thereof, said flange extension and bridging portions and said offset portion being marginally coextensively shaped and thereby adapted to locate said flange extension and bridging portions so as properly to relate the inner and outer cuffs of each pair, and substantially flat-topped, trough-shaped members having coplanar marginal flanges flatly engaging said flange extension and bridging portions, said dished member, flange extension and bridging portions, and flanges of the trough-shaped members being welded together in a relationship wherein in the trough-shaped members cover said openings respectively.

3. A burner and tray assembly made according to claim 2, wherein the flange extension and bridging portions of the respective inner cuffs are separate from one another and the flanges of the trough-shaped members are welded to the flat bottom constituted by the dished member and the flange extension and bridging portions.

4. A burner and tray assembly made according to claim 2, wherein the flange extension and bridging portions of the respective inner cuffs are integrally interconnected and the flanges of the trough-shaped members are welded thereto exclusively.

References Cited in the file of this patent

UNITED STATES PATENTS

| | | |
|---|---|---|
| 338,143 | Dooly | Mar. 16, 1886 |
| 457,081 | Grant | Aug. 4, 1891 |
| 1,486,668 | Kielberg | Mar. 11, 1924 |
| 2,156,533 | Harper | May 2, 1939 |
| 2,470,880 | Zimbelman et al. | May 24, 1949 |
| 2,497,787 | Minster | Feb. 14, 1950 |
| 2,595,005 | Shelton et al. | Apr. 29, 1952 |
| 2,701,610 | Carlson | Feb. 8, 1955 |